United States Patent [19]

Kennedy et al.

[11] 3,930,515

[45] Jan. 6, 1976

[54] PNEUMATIC CONTROL SYSTEM AND VALVE CONSTRUCTION THEREFOR OR THE LIKE

[75] Inventors: Billy Edward Kennedy, Maryville; Boyd Paul Sliger, Concord, both of Tenn.

[73] Assignee: Robertshaw Controls Company, Richmond, Va.

[22] Filed: July 22, 1974

[21] Appl. No.: 490,590

[52] U.S. Cl. .......... 137/102; 137/625.66; 251/61.4; 123/117 A
[51] Int. Cl.[2] .................................... F16K 31/365
[58] Field of Search............. 137/102, 625.66, 106; 251/61.3, 61.4, 61.5; 123/117 A, 119

[56] References Cited
UNITED STATES PATENTS

| | | | |
|---|---|---|---|
| 2,474,772 | 6/1949 | Ashton................ | 137/102 |
| 3,512,560 | 5/1970 | Weise................. | 137/102 |
| 3,613,710 | 10/1971 | Oberthur............. | 137/102 |
| 3,683,968 | 8/1972 | Akeley............... | 137/625.66 |
| 3,704,697 | 12/1972 | Weymann........... | 123/117 A |
| 3,779,220 | 12/1973 | Wu..................... | 123/117 A |
| 3,789,811 | 2/1974 | Franz et al.......... | 123/117 A |
| 3,791,398 | 1/1974 | Vickery.............. | 137/102 |

FOREIGN PATENTS OR APPLICATIONS

| | | | |
|---|---|---|---|
| 1,074,689 | 7/1967 | United Kingdom............ | 137/625.66 |
| 1,152,856 | 8/1963 | Germany............................ | 137/102 |
| 1,273,005 | 8/1961 | France............................... | 137/625.66 |

*Primary Examiner*—William R. Cline
*Assistant Examiner*—H. Jay Spiegel
*Attorney, Agent, or Firm*—Candor, Candor & Tassone

[57] ABSTRACT

A pneumatic control system having a source of pneumatic fluid and a pneumatically operated device to be operated by the source when interconnected thereto by a valve construction when the same is in one operating condition thereof. The valve construction interconnects the atmosphere to the device when in another operating condition thereof. The valve construction has a housing provided with a chamber and three spaced ports leading to the chamber, one of the ports being interconnected to the source of fluid, another of the ports being interconnected to the device and the remaining port being interconnected to the atmosphere. A valve seat separates the one port from the other port and the remaining port. A movable valve member controls the valve seat, the valve member closing the valve seat when the valve construction is in the other condition thereof and opening the valve seat when the valve construction is in the one condition thereof. A pneumatically operated actuator moves the valve member relative to the valve seat, the actuator being controlled by the source of fluid through the one port of the housing.

18 Claims, 5 Drawing Figures

PNEUMATIC CONTROL SYSTEM AND VALVE CONSTRUCTION THEREFOR OR THE LIKE

This invention relates to an improved pneumatic control system as well as to an improved valve construction for such a control system or the like.

It is well known that a pneumatically operated valve construction has been provided for interconnecting a source of fluid to a control device when the pneumatically operated valve construction is in one operating condition thereof and to disconnect the pneumatic source from the control device when the valve construction is in another operating condition thereof, the valve construction being pneumatically controlled to provide for the various operating conditions thereof.

Accordingly, it is a feature of this invention to provide an improved valve construction of the above type wherein the valve construction is also adapted to interconnect the atmosphere to the control device when the valve construction disconnects the pneumatic source from such control device.

Another feature of this invention is to provide an improved pneumatic control system utilizing such a valve construction or the like.

In particular, one embodiment of the pneumatically operated control system of this invention comprises a source of pneumatic fluid and a pneumatically operated device that is interconnected to the source of fluid by a valve construction of this invention when the valve construction is in one operating condition thereof. When the valve construction is in another operating condition thereof, the same interconnects the atmosphere to the device while disconnecting the fluid source therefrom. The valve construction has a housing means provided with a chamber therein and with three spaced port means leading to the chamber, one of the port means being interconnected to the source of fluid, another of the port means being interconnected to the device and the remaining port means being interconnected to the atmosphere. The housing has a valve seat separating the one port means from the other port means and the remaining port means. The housing has a movable valve member controlling the valve seat, the valve member closing the valve seat when the valve construction is in the other operating condition thereof and the valve member opening the valve seat when the valve construction is in the one operating condition thereof. The valve construction has a pneumatically operated actuator for moving the valve member between its positions, the actuator being controlled by the source of fluid being interconnected threreto through the one port means of the housing.

Accordingly, it is an object of this invention to provide an improved pneumatic control system having one or more of the novel features set forth above or hereinafter shown or described.

Another object of this invention is to provide an improved valve construction having one or more of the novel features set forth above or hereinafter shown or described.

Other objects, uses and advantages of this invention are apparent from a reading of this description which proceeds with reference to the accompanying drawings forming a part thereof and wherein.

Figures 1, 2, 3:
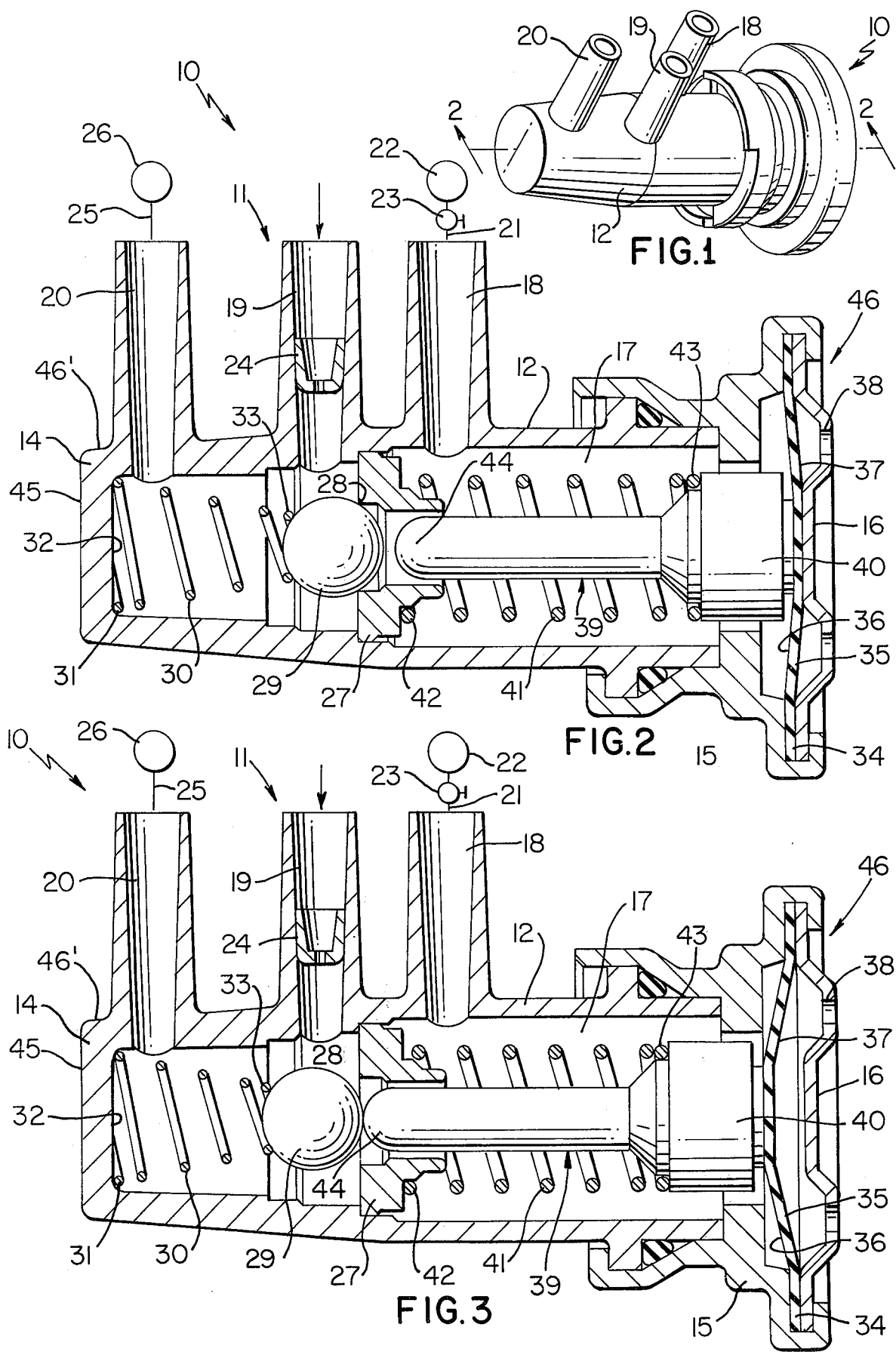
FIG. 1 is a perspective view of the improved valve construction of this invention.
FIG. 2 is an enlarged, cross-sectional view of the valve construction of FIG. 1 taken on line 2—2 thereof and schematically illustrating the improved pneumatic control system of this invention.
FIG. 3 is a view similar to FIG. 2 and illustrates the valve construction in another operating condition thereof.

While the various features of this invention are hereinafter described and illustrated as being particularly adapted to provide a vacuum operated valve construction, it is to be understood that the various features of this invention can be utilized singularly or in any combination thereof to provide a valve construction that can be operated by other pneumatic fluids as desired.

Therefore, this invention is not to be limited to only the embodiments illustrated in the drawings, because the drawings are merely utilized to illustrate one of the wide variety of uses of this invention.

Referring now to FIGS. 1 and 2, the improved valve construction of this invention is generally indicated by the reference numeral 10 and is utilized in the improved pneumatic control system of this invention that is generally indicated by the reference numeral 11 in FIGS. 2 and 3.

The valve construction 10 comprises a housing means 12 formed from a plurality of housing parts 14, 15 and 16 suitably secured together to define a chamber 17 in the housing means 12 that is interconnected to the exterior thereof by three port means 18, 19 and 20 which are disposed in axially spaced relation along the longitudinal axis of the housing member 14 and can comprise nipple extensions thereof for fluidly interconnecting the same in the system 11 of this invention.

In particular, the port means 18 is adapted to be interconnected by suitable conduit means 21 to a vacuum source 22, the conduit means 21 having a selector valve means 23 therein that is opened either manually, automatically or by condition responsive means a certain amount to cause the valve construction 10 to change its operating condition from the condition illustrated in FIG. 2 to the condition illustrated in FIG. 3 for a purpose hereinafter described.

The port 19 of the valve construction 10 is adapted to be interconnected to the atmosphere either by merely remaining open as illustrated or being interconnected to an atmospheric source by suitable conduit means interconnected thereto, the port means 19 having a restrictor means 24 disposed therein for a purpose hereinafter described.

The port means 20 is adapted to be interconnected by a conduit means 25 to a pneumatically operated device 26 for a purpose hereinafter described.

A valve seat member 27 is disposed in the chamber 17 intermediate the port means 18 and 19 and has a valve seat 28 adapted to be opened and closed by a ball valve member 29 normally urged to its closed position by a compression spring 30 having one end 31 bearing against an end wall 32 of the housing member 14 and another end 33 bearing against the valve member 29.

The housing members 15 and 16 cooperate together to hold an outer peripheral means 34 of a flexible diaphragm 35 therebetween whereby the flexible diaphragm 35 closes off the right hand end of the chamber 17 as the side 36 thereof faces the chamber 17 while the other side 37 thereof is exposed to the atmosphere by suitable openings 38 formed in the end cap housing member 16 as illustrated. In this manner, the diaphragm 35 forms part of a pneumatic actuator of the valve construction that is generally indicated by the reference numeral 46.

A valve stem member 39 is disposed in the chamber 17 of the housing means 12 and has one end 40 bearing against the side 36 of the flexible diaphragm 35 to follow movement thereof as a compression spring 41 acts on the same to tend to urge the stem 39 in a direction against the side 36 of the flexible diaphragm 35. In particular, one end 42 of the compression spring 41 bears against the valve seat member 27 while the other end 43 thereof bears against the enlarged end 40 of the stem member 39 whereby the force of the compression spring 41 urges the end 40 of the stem member 39 into engagement with the flexible diaphragm 35.

The other end 44 of the stem member 39 projects into the valve seat 28 and is normally spaced from the valve member 29 in the manner illustrated in FIG. 2 when the diaphragm 35 of a pneumatically operated actuator 46 of the valve construction 10 is in the unactuated condition illustrated in FIG. 2. However, when the pneumatically operated actuator 46 is in the acuated condition illustrated in FIG. 3, it can be seen that the diaphragm 35 has been moved to the left in FIG. 3 and causes the end 44 of the valve stem 39 to engage against the valve member 29 and move the same away from the valve seat 28 in opposition to the force of the compression spring 30 to thereby interconnect the ports 19 and 20 through the now open valve seat 28 for a purpose hereinafter described.

Figure 4:
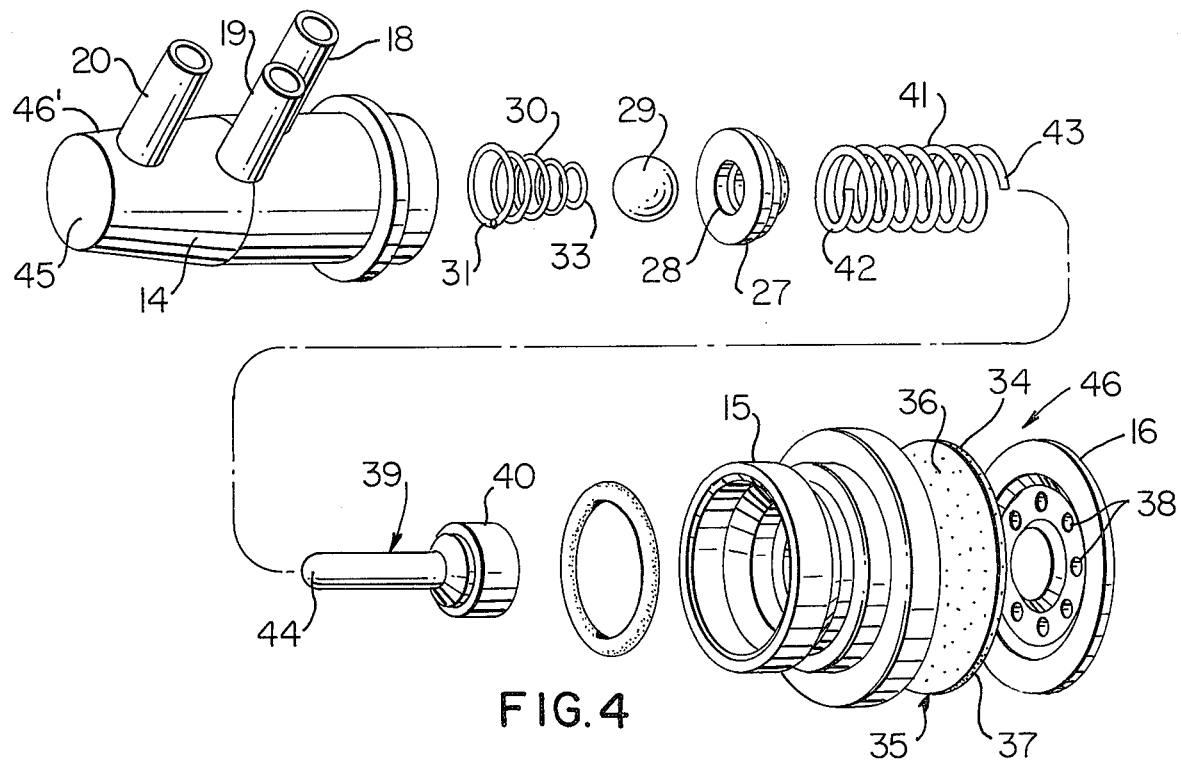
FIG. 4 is an exploded perspective view of the various parts of the valve construction of FIGS. 1-3.

Therefore, it can be seen that the valve construction 10 of this invention can be formed from a plurality of inexpensive parts formed in the configurations illustrated in FIG. 4 and be readily assembled together in the manner illustrated in FIGS. 2 and 3 to operate in the control system 11 of this invention in a manner now to be described.

Assuming that the selector means 23 is either in an "off" condition thereof or it is in such an open condition thereof that insufficient vacuum is being provided in the chamber 17 to the right of the valve seat 28 to permit the resulting pressure differential acting across the diaphragm 35 to overcome the force of the compression spring 41 as well as the force of the compression spring 30 should the valve stem 39 be moved to the left to contact the valve member 29, it can be seen that the valve member 29 will be in a closed position against the valve seat 28 as illustrated in FIG. 2 so that the atmosphere is interconnected by the port means 19 through the restrictor 24 thereof to the pneumatically operated device 26 which will be in a particular operating condition thereof.

However, when the selector means 23 is opened sufficiently to cause the resulting pressure differential acting across the diaphragm 35 to move the diaphragm 35 to the left as illustrated in FIG. 3 to overcome the combined forces of the compression springs 41 and 30, the valve member 29 is moved away from the valve seat 28 and permits the vacuum source 22 at the port means 18 to be interconnected through the open valve seat 28 to the port means 20 leading to the pneumatically operated device 26 to cause the same to be in another operating condition thereof in a manner well known in the art, the restriction means 24 in the port means 19 preventing the atmosphere from entering into the chamber 17 at a sufficient rate to prevent the source 22 from changing the operating condition of the pneumatically operated device 26 in the manner previously described.

Thus, as long as the vacuum in the chamber 17 is sufficient to hold the diaphragm 35 to the left as illustrated in FIG. 3, the vacuum source 22 will be interconnected to the pneumatically operated device 26. However, when the force of the vacuum in the chamber 17 falls below the combined force of the compression springs 30 and 41 acting to move the valve member 29 and stem 39 to the right, the same will move to the right and thereby permit the valve member 29 to close against the valve seat 29 and thereby disconnect the vacuum source 22 from the pneumatically operated device 26 which will return to atmospheric condition as the atmosphere bleeds through the restriction means 24 of the port means 19 to cause the device 26 to return to its atmospheric condition.

Should it be desired to adjust the force of the spring 30 acting on the valve member 29 to close the same and, thus, vary the amount of vacuum force required to cause the valve member 29 to initially crack open, the end wall 32 of the housing member 14 can be deformed either by forming dimples in the outer side 45 thereof to increase the force of the compression spring 30 or by providing dimples in the annular part 46' thereof to decrease the force of the compression spring 30.

Therefore, it can be seen that the valve construction 10 operates in a simple manner to effectively either interconnect the vacuum source 22 to the pneumatically operated device 26 or to disconnect the vacuum source 22 therefrom while interconnecting the atmosphere thereto as previously described.

Figure 5:
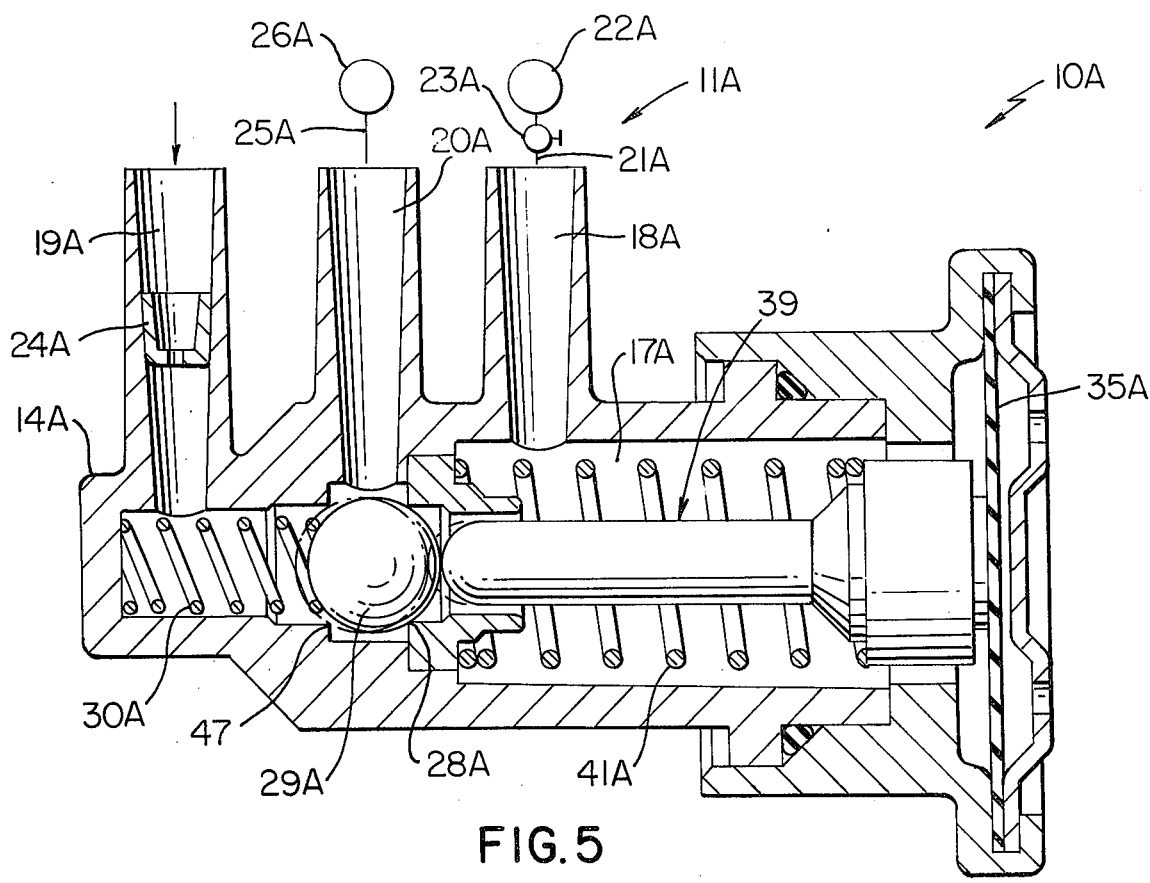
FIG. 5 is a view similar to FIG. 2 and illustrates another embodiment of the valve construction of this invention.

Another valve construction of this invention is generally indicated by the reference numeral 10A in FIG. 5 and is utilized in another pneumatic control system of this invention that is generally indicated by the reference numeral 11A in FIG. 5, the parts of the system 11A and valve construction 10A similar to the system 11 and valve construction 10 previously described are indicated by like reference numerals followed by the reference letter "A".

As illustrated in FIG. 5, the control device 10A is substantially identical to the valve construction 10 previously described except that the housing member 14A has another valve seat 47 formed in the chamber 17A spaced from the first valve seat 28A to also be opened and closed by the valve member 29A in a manner hereinafter described.

In addition, the port means 19A and 20A of the valve construction 10A are reversed from the port means 19 and 20 of the valve construction 10 previously described so that the port means 20A is disposed intermediate the two valve seats 28A and 47 of the valve construction 10A as well as intermediate the port means 19A and 18A for a purpose hereinafter described.

The port means 20A is interconnected by the conduit means 25A to the pneumatically operated device 26A while the port means 18A is interconnected by the conduit means 21A to the vacuum source 22A with the conduit means 21A having the selector means 23A disposed therein.

The operation of the valve construction 10A in the pneumatic control system 11A of this invention will now be described.

As previously stated, should the vacuum force in the chamber 17A be insufficient to move the diaphragm 35A to the left from the position illustrated in FIG. 5, the compression spring 30A maintains the valve member 29A in its closed position against the valve seat 28A whereby the valve member 29A is away from the valve seat 47 so that the valve seat 47 is open and permits atmosphere from the port means 19A to be interconnected to the port means 20A, and, thus, to the pneumatically operated device 26A while the vacuum source 22A is prevented from being interconnected to the pneumatically operated device 26A by the closed valve seat 28A.

However, when the force of the vacuum in the chamber 17A increases sufficiently so that the resulting pressure differential acting across the diaphragm 35A is sufficient to move the diaphragm 35A to the left in FIG. 5 and overcome the force of the compression springs 30A and 41A, the valve member 29A is moved away from the valve seat 28A and into engagement with the valve seat 47 to close the same whereby the vacuum source 22A is now interconnected through the open valve seat 28A to the pneumatically operated device 26A to operate the same in the manner previously described while the atmospheric source from the port means 19A is completely disconnected from the device 26A by the closed valve seat 47.

Subsequently, should the force of the vacuum in the chamber 17A drop so that the compression springs 30A and 41A permit the ball valve member 29A to move back to the full line position illustrated in FIG. 5 to close the valve seat 28A, it can be seen that the valve member 29A opens the valve seat 47 to interconnect the atmosphere at the port 19A through the restrictor means 24A thereof to the control device 26A to deactuate the same as the vacuum source 22A is disconnected therefrom by the now closed valve seat 28A.

Therefore, it can be seen that this invention not only provides improved valve constructions, but also this invention provides an improved pneumatic control system utilizing such valve constructions or the like.

While the forms and methods of this invention have been described and illustrated as required by the Patent Statute, it is to be understood that other forms and method steps can be utilized and still come within the scope of the appended claims.

What is claimed is:

1. A pneumatic control system comprising a source of vacuum that is sub-atmospheric, a vacuum operated device, and a valve construction for interconnecting said source of vacuum to said device when in one operating condition thereof and for interconnecting the atmosphere to said device when in another operating condition thereof, said valve construction having a housing means provided with a chamber therein and with three spaced port means leading to said chamber, one of said port means being interconnected to said source of vacuum, another of said port means being interconnected to said device, the remaining port means being interconnected to the atmosphere, said housing having a valve seat separating said one port means from said other port means and said remaining port means, said housing having a movable valve member for controlling said valve seat, said valve member closing said valve seat when said valve construction is in said other condition thereof and said valve member opening said valve seat when said valve construction is in said one condition thereof, said valve construction having a vacuum operated actuator for moving said valve member, said actuator being controlled by said source of vacuum through said one port means of said housing, said remaining port means having a restrictor means therein between said chamber of said housing and said atmosphere to bleed atmosphere therethrough at a rate slower than the evacuation rate of said source so that said source can operate said device when all of said ports are interconnected together.

2. A pneumatic control system as set forth in claim 1 wherein said housing has another valve seat disposed between said remaining port means and said other port means to be opened and closed by said valve member.

3. A pneumatic control system as set forth in claim 2 wherein said other port means is disposed intermediate said one port means and said remaining port means as well as intermediate said valve seats.

4. A pneumatic control system as set forth in claim 3 wherein said valve member when in said one condition thereof closes said other valve seat and when in said other condition thereof opens said other valve seat.

5. A pneumatic control system as set forth in claim 1 wherein said actuator comprises a flexible diaphragm carried by said housing and having one side exposed to said chamber and the other side exposed to the atmosphere.

6. A pneumatic control system as set forth in claim 5 wherein said actuator includes a stem having one end engageable with said one side of said diaphragm and another end for engaging said valve member to move the same relative to said valve seat.

7. A pneumatic control system as set forth in claim 6 wherein said other end of said stem is adapted to project through said valve seat to engage said valve member.

8. A pneumatic control system as set forth in claim 6 wherein a spring is carried by said housing and acts on said valve member in direction to tend to move said valve member to close said valve seat.

9. A pneumatic control system as set forth in claim 8 wherein another spring is carried by said housing and acts on said stem in a direction to tend to maintain said one end of said stem in engagement with said diaphragm.

10. A valve construction for interconnecting a source of vacuum that is sub-atmospheric to a vacuum operated device when in one operating condition thereof, and for interconnecting the atmosphere to said device when in another operating condition thereof, said valve construction comprising a housing means provided with a chamber therein and with three spaced port means leading to said chamber, one of said port means being adapted to be interconnected to said source of vacuum, another of said port means being adapted to be interconnected to said device, the remaining port means being adapted to be interconnected to the atmosphere, said housing having a valve seat separating said one port means from said other port means and said remaining port means, said housing having a movable valve member for controlling said valve seat, said valve member closing said valve seat when said valve construction is in said other condition thereof and said valve member opening said valve seat when said valve construction is in said one condition thereof, said valve construction having a vacuum operated actuator for moving said valve member, said actuator being adapted to be controlled by said source of vacuum through said one port means of said housing, said remaining port means having a restrictor means therein between said chamber of said housing and said atmosphere to bleed atmosphere therethrough at a rate slower than the evacuation rate of said source so that said source can operate said device when all of said ports are interconnected together.

11. A valve construction as set forth in claim 10 wherein said housing has another valve seat disposed between said remaining port means and said other port means to be opened and closed by said valve member.

12. A valve construction as set forth in claim 11 wherein said other port means is disposed intermediate said one port means and said remaining port means as well as intermediate said valve seats.

13. A valve construction as set forth in claim 12 wherein said valve member when in said one condition thereof closes said other valve seat and when in said other condition thereof opens said other valve seat.

14. A valve construction as set forth in claim 10 wherein said actuator comprises a flexible diaphragm carried by said housing and having one side exposed to said chamber and the other side exposed to the atmosphere.

15. A valve construction as set forth in claim 14 wherein said actuator includes a stem having one end engageable with said one side of said diaphragm and another end for engaging said valve member to move the same relative to said valve seat.

16. A valve construction as set forth in claim 15 wherein said other end of said stem is adapted to project through said valve seat to engage said valve member.

17. A valve construction as set forth in claim 15 wherein a spring is carried by said housing and acts on said valve member in a direction to tend to move said valve member to close said valve seat.

18. A valve construction as set forth in claim 17 wherein another spring is carried by said housing and acts on said stem in a direction to tend to maintain said one end of said stem in engagement with said diaphragm.

* * * * *